United States Patent [19]

McGuire

[11] Patent Number: 4,579,085

[45] Date of Patent: Apr. 1, 1986

[54] PEST CONTROL METHOD AND APPARATUS

[75] Inventor: Willis C. McGuire, St. Joseph, Mo.

[73] Assignee: Philips Roxane, Inc., St. Joseph, Mo.

[21] Appl. No.: 692,325

[22] Filed: Jan. 16, 1985

Related U.S. Application Data

[63] Continuation of Ser. No. 485,603, Apr. 18, 1983, abandoned.

[51] Int. Cl.⁴ ............................................. A01K 13/00
[52] U.S. Cl. ..................................... 119/156; 40/301
[58] Field of Search .................. 119/156; 40/301, 302

[56] References Cited

U.S. PATENT DOCUMENTS

| | | | |
|---|---|---|---|
| 3,935,839 | 2/1976 | Goodwin | 119/156 |
| 3,949,708 | 4/1976 | Meeks | 40/301 X |
| 4,150,109 | 4/1979 | Dick et al. | 119/156 X |
| 4,184,453 | 1/1980 | Ritchey | 119/156 |
| 4,366,777 | 1/1983 | Akhavein et al. | 119/156 |

Primary Examiner—Robert P. Swiatek
Attorney, Agent, or Firm—Schmidt, Johnson, Hovey & Williams

[57] ABSTRACT

A device and method for controlling ectoparasites on agricultural livestock is disclosed which gives improved long term application of a pesticidal composition directly to the most frequently infested areas on the livestock. The pesticidal device hereof comprises an elongated, flexible, synthetic resin carrier strip which includes an incorporated volatile or non-volatile pesticide. An attachment is provided for fastening the device in cantilever fashion from an appendage of or an object worn by the animal, or to a portion of an animal confinement area, so as to assure that the device comes into repeated or continuing contact with adjacent portions of the animal's body. The device is advantageously of a length for free swinging movement thereof in response to the natural movement of the animal, thereby releasing the incorporated pesticidal composition from the device for direct application to a relatively large portion of the animal's body. Indirect application of the pesticide to the remaining portions of the animal's exterior surface is accomplished by diffusion of pesticide from the application site.

11 Claims, 17 Drawing Figures

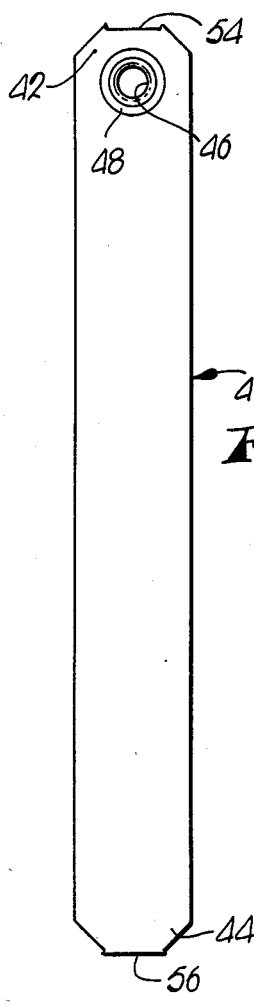
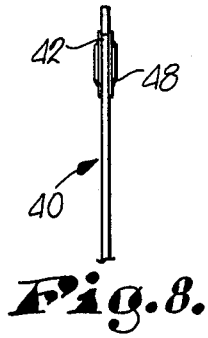
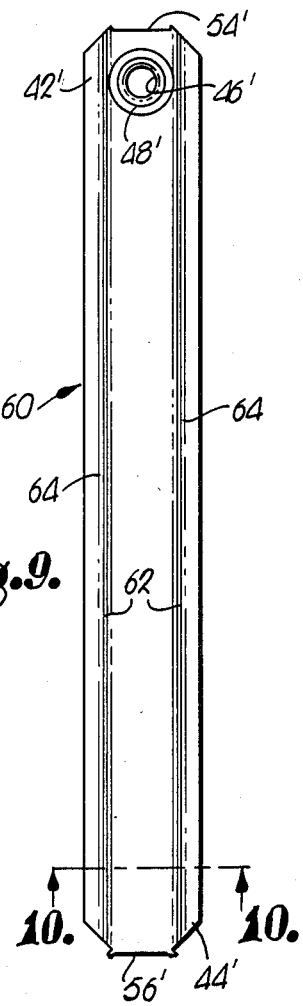
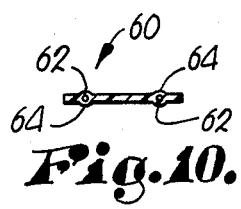
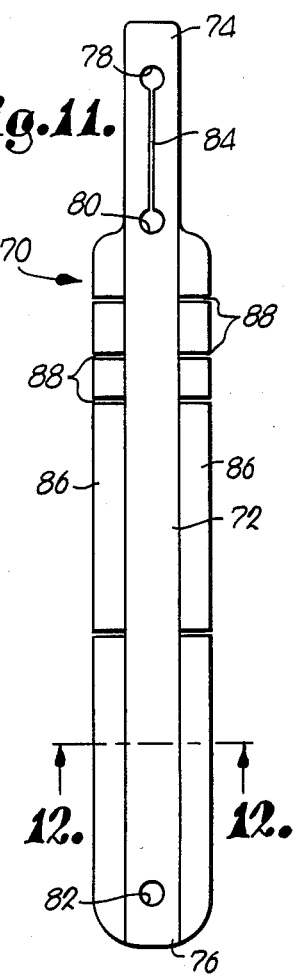
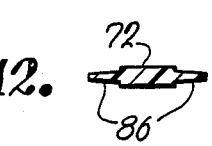
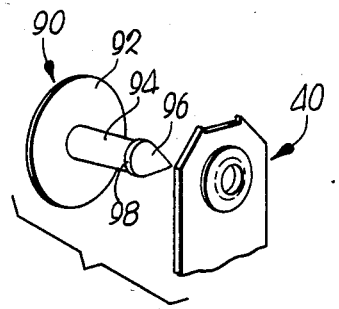
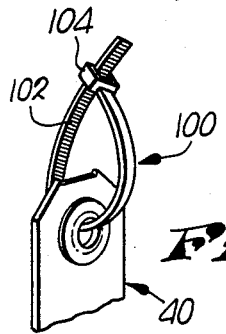
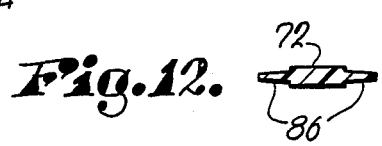
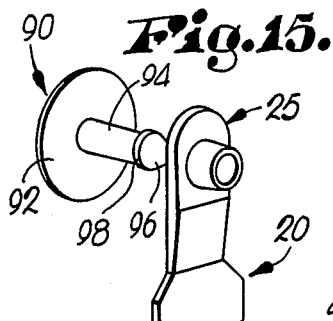
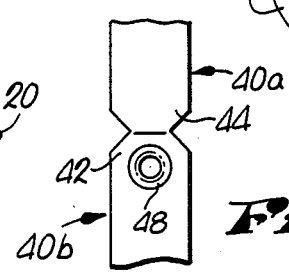
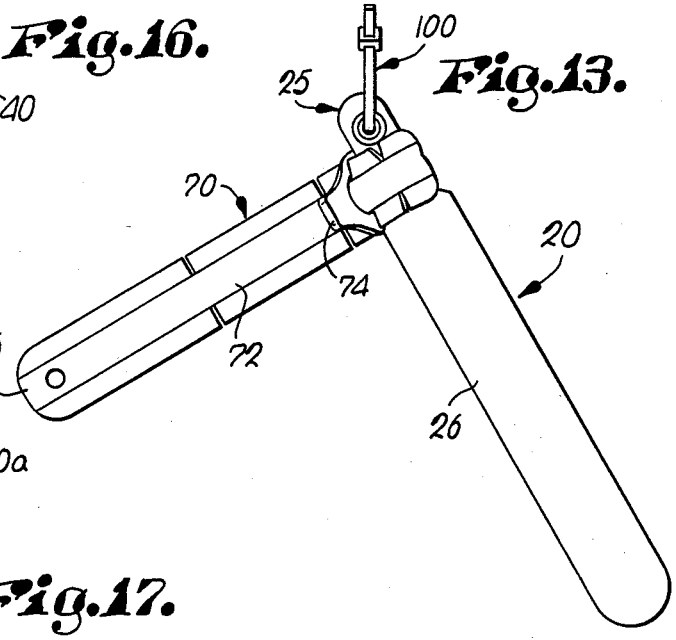

BEST CONTROL METHOD AND APPARATUS

This application is a continuation of Ser. No. 485,603, filed Apr. 18, 1983, now abandoned.

BACKGROUND OF THE INVENTION

1. Field of the Invention

This invention relates to a method and device for controlling ectoparasites on agricultural livestock. More particularly, it pertains to use of synthetic resin strips impregnated with a pesticidal composition, and means for attaching the strips directly to or in proximity with the livestock for improved application of the pesticidal composition to the livestock's skin.

2. Description of the Prior Art

Attempts have been made in the past to control ectoparasties on livestock such as cattle (e.g., horn flies and ticks) through use of pesticidal compositions incorporated into soid synthetic resin eartags of relatively small square or rectangular configurations, or bands which surround the ear. Typically, such prior devices are secured in place by means of a rivet-type fastener, and, in the case of tags, largely or wholly nest within the concavity of the animal's ear. Exterior bands on the other hand encircle the base of the ear. Exemplary teachings of insecticidal eartags or bands can be found in U.S. Pat. Nos. 4,195,075, 4,265,876, and 3,942,480, as well as in: "Prevention of Screwworm Infestation in Cattle by Controlling Gulf Coast Ticks with Slow Release Insecticide Devices: by E. H. Ahrens, et al., *Journal of Economic Entomology*, Vol. 70, No. 5, p. 581, October 1977; "Field Tests of Insecticides for Control of the Gulf Coast Tick on Cattle: by W. J. Gladney, et al., *Journal of Medical Entomology*, Vol. 13, No. 4–5, p. 579, January, 1977; "Field Trials of Insecticides in Controlled-Release Devices for Control of Gulf Coast Tick and Prevention of Screwworm in Cattle" by W. J. Gladney, *Journal of Economic Entomology*, Vol. 69, No. 6, p. 757, December 1976; "Horn Fly Control With An Insecticide-Impregnated Ear Tag: by E. H. Ahrens, *The Southwestern Entomologist*, Vol. 2, No. 1, March 1977; and "Horn Fly Control With Dichlorovos-Impregnated Strips" by T. L. Harvey, et al., *Journal of Economic Entomology*, Vol. 63, No. 5, October 1970. The last-mentioned article also describes the use of an insecticidal collar which encircles the neck of cattle.

While such prior devices have achieved limited success, they are plagued with a number of deficiencies. For example, while these devices appear to adequately control infestation within the animal's ear, they are less effective in controlling parasites in and around other sensitive areas on the animal's face, e.g., eyes and nasal regions. By the same token, they are inadequate in protecting other distal regions on the animal's body such as the legs, tail and underbelly. These problems are particularly acute in those geographical areas where parasite infestation is most severe, e.g., in the southern regions of the United States.

Accordingly, there is a real and unsatisfied need in the art for improved parasite control devices which give enhanced protection over a greater area of an animal's body than has heretofore been possible. In addition, the art would benefit from the provision of a parasite control device giving substantially improved parasite protection, as compared with prior devices of this character.

SUMMARY OF THE INVENTION

The problems outlined above are in large measure solved by the present invention which provides a greatly improved parasite control device and method which is especially designed for the control of parasites which commonly infest animals such as agricultural livestock (e.g., cattle, horses and sheep), poultry or domestic animals such as dogs and cats.

Broadly speaking, the preferred control devices of the invention include an elongated, flexible, synthetic resin strip having opposed first and second end portions and a parasite control composition incorporated therein. Means are also provided for cantilever attachment of the first end portion of the strip at a desired attachment site on or adjacent an animal, with the second end portion of the strip hanging freely and swingably in spaced relationship to the attachment site. The length and flexibility of the strip are sufficient so that the second end portion of the strip swings into direct, at least partially conforming contact with adjacent surface areas of the animal (such as the animal's skin, hair, or feathers) during natural body movements of the animal. In this fashion, the parasite control composition incorporated into the strip is directly released onto the adjacent surface areas. Generally speaking, the strip of the invention should have a length exceeding 4 inches, and more preferably from about 5 to 12 inches; a width of at least about $\frac{1}{4}$ inch, and preferably from about $\frac{1}{4}$ inch to 2 inches; a thickness of at least about 1/32 inch, and preferably from about 1/32 inch to $\frac{1}{4}$ inch; and a length to width ratio of at least about 2.5:1 and preferably from about 2.5:1 to 48:1.

In particularly preferred forms, the devices of the invention may be attached directly to an appendage of the animal such as the ears or tail, or to other objects such as bridles, halters, stanchions, feeders, cages, fences or stalls which are adjacent the animal or with which the animal comes into frequent contact. For example, cattle may be protected from parasites by affixing the elongated, flexible cantilever-mounted strips of the invention to the ears thereof. Then, as the animal moves its head, or merely its ears, the strips will be moved or thrown into direct, at least partially conforming contact with the animals's face, and particularly adjacent the eyes and nasal areas of the animal. This provides the desirable high concentration of pesticide at or adjacent these sensitive areas, which are sites preferred by insect pests.

In preferred forms of the invention, the devices of the invention are formed by extrusion techniques using a synthetic resin such as polyvinyl chloride, along with appropriate plasticizer agents. A wide variety of specific parasite control compositions can be incorporated into the strips, typically by uniformly dispersing such composition through the synthetic resin matrix. The material may be volatile or non-volatile in ambient air, and advantageously is selected from the pyrethroids, a prime example being permethrin.

BRIEF DESCRIPTION OF THE DRAWING

FIG. 7 is a second embodiment of a pest control device in accordance with the present invention;

FIG. 8 is a fragmentary side view of the pest control device depicted in FIG. 7;

FIG. 9 is a front, elevational view of a third embodiment of a pest control device in accordance with the present invention;

FIG. 10 is a sectional view taken along line 10—10 of FIG. 9;

FIG. 11 is a fourth embodiment of a pest control device in accordance with the present invention;

FIG. 12 is a sectional view taken along line 12—12 of FIG. 11;

FIG. 13 is an elevational view depicting a pest control device in accordance with the fourth embodiment of the invention coupled to the pest control device in accordance with the first embodiment to form a combination device;

FIG. 14 is a fragmentary view of a pest control device in accordance with the second embodiment of the invention, depicting a mechanism for attaching the device to the appendage of an animal;

FIG. 15 is a fragmentary view of a pest control device in accordance with the second embodiment of the invention depicted in conjunction with an attachment mechanism for fastening the pest control device to an appendage of an animal;

FIG. 16 is a fragmentary view of a pest control device in accordance with the second embodiment of the invention in conjunction with an alternative attachment mechanism; and FIG. 17 is a fragmentary view of the end portion and a leading portion of two pest control devices prior to separation of the devices.

DESCRIPTION OF THE PREFERRED EMBODIMENTS

Figure 1:
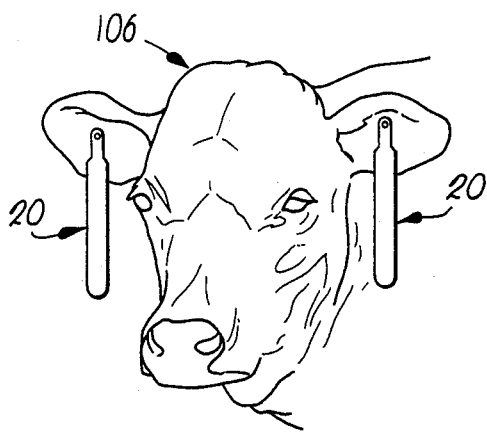
FIG. 1 is a perspective view of the head of a cow to which pest control devices in accordance with the present invention are attached.

Referring to the drawing, several embodiments of a pest control apparatus in accordance with the present invention are depicted. Although each of the embodiments is structurally different in detail, each comprises an elongated, thin, flexible strip of synthetic resin material suitable for attachment on or closely adjacent an animal (see FIGS. 1 through 3), or for positioning within an animal confinement area (see FIG. 4).

The synthetic resin material employed can be thermoplastic or thermosetting in nature, and should have adequate strength and flexibility to withstand molding or shaping into strips, and to withstand extreme temperatures and physical stresses without breaking, cracking or crumbling. Further, the resin should be one which will permit adequate migration of the active pesticide incorporated within the strip from the body of the strip to its surface. The foregoing requirements of the resin are fulfilled by solid polyvinylic resins, that is, polymers formed by polymerization through a vinylic double bond. Polyvinylic resins are typified by the polyvinyl halides, such as polyvinylchloride, polyvinylchlorodivinyl acetate and polyvinyl fluoride, the polyacylate and polymethacrylate esters such as polymethyl acrylate and polymethyl methacrylate and polyvinyl benzenes such as polystyrene, polyvinyl toluene. The resin advantageously comprises from about 35% to 75% by weight of the total strip, and preferably from about 40% to 60%.

The composition of the strip also advantageously includes plasticizers for plasticizing the solid resin matrix. The particular plasticizer or plasticizers employed will depend upon the particular resin used. The suitable plasticizers include esters of phosphoric acid such as tricresyl phosphate and esters of phthalic acid such as dioctyl or dibenzyl phthalate as well as complex linear polyesters, polymeric plasticizers, and epoxidized soybean oils. The amount of plasticizer used may comprise from about 15 to 50%, and preferably from about 25 to 40%, by weight, of the total composition of the strip. The amount of plasticizer used governs the flexibility of the strip, and the latter may preferably vary between a durometer value of about 50 to 90, in order that the resultant strip will properly flex and "flop" during use and come into partial conforming contact with uneven surfaces on the animal's body.

The composition of the strip material may also include other optional ingredients such as stabilizers, lubricants, fillers, and coloring materials. Suitable stabilizers are the antioxidants and agents which protect the resin from radiation and undue degradation during extrusion or molding processing. Stearic acid and low molecular weight polyethylene are examples of lubricants which may be used. The ingredients may be used in a concentration of up to about 10% by weight of the total composition.

The pesticidal qualities of the control device in accordance with the invention are provided by incorporating a pesticidal compound throughout the matrix of polymeric resin, plasticizer, and stabilizer composition described above. Such an anti-parasite control compound should be present at a level of from about 2 to 25% by weight in the overall strip, and more preferably from about 4 to 15% by weight. One pesticidal composition that has been found to be particularly effective is permethrin, (3-phenoxyphenyl)methyl (±)cis, trans-3-(2,2-dichloroethenyl)-2,2-dimethylcyclopropanecarboxylate. The permethrin component most preferably comprises about ten percent by weight of the total strip composition.

The pest control device as described above is in the form of a flexible solid which exhibits the properties of a thick viscous fluid in that surface molecules of the pesticide are released from the polymer by rejection, diffusion, evaporation or mechanical erosion, only to be quickly replaced by migration or additional pesticidal molecules from within the product. Particles displaced from the surface of the strip are replenished continuously in decreasing amounts, as the reservoir in the center becomes depleted.

When the pest control device in accordance with the present invention is attached to an animal, or when there is frequent contact between the animal, and the device, pesticide is directly distributed over the contacted portion of the animal's external surface areas (e.g. skin, hair, feathers). It is also important to note that the pesticide is fat soluble, and may therefore be picked up by adjacent hair or feather oils of the animal, and thereby moved to hair or feather contact areas not directly contacted by the device. It will therefore be appreciated that pesticide will be distributed in concentrated amounts to selected portions of the animal's body which comes into direct contact with the device hereof, and diffusion of the pesticide from such areas of direct contact will result in complete coverage of the animal by the pesticidal compound.

Figure 5:
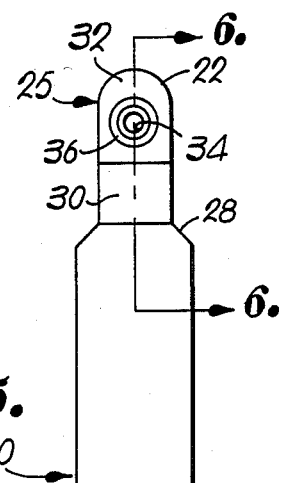
FIG. 5 is a front elevational view of a first embodiment of a pest control device in accordance with the present invention.
Figure 6:
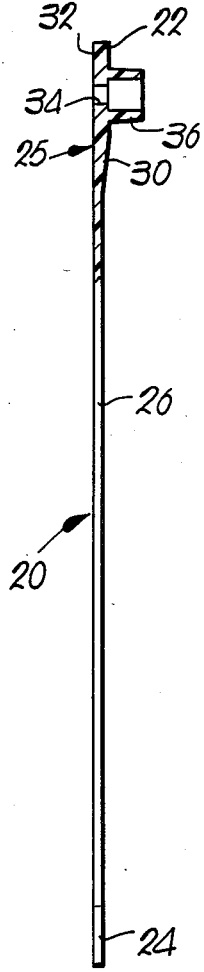
FIG. 6 is a sectional view taken along line 6—6 of FIG. 5.

The first embodiment 20 of the pest control apparatus is depicted in FIGS. 5 and 6. The apparatus 20 comprises an elongated strip having first and second end portions 22, 24. The first end portion 22 comprises a necked-down, apertured attachment tab 25, and the end portion 24 is part of the main body 26 of the strip. The strip advantageously exceeds about 4 inches in length and preferably should be from about 7 to 12 inches in length. The main body 26 is of uniform cross-section, whereas the width of the main body 26 may vary from about ¼ to 2 inches, and is advantageously from 1/32 to ¼ inches in thickness.

The second end portion 24 presents an arcuate, lowermost edge for the strip. The top portion of the main body 26 angles inwardly as at 28 toward the narrower width of the tab 25 second end portion 24.

The attachment tab 25 includes a tapered portion 30 and a reinforced portion 32. The portion 32 is of thicker cross-section than the thickness of main body 26. Reinforced portion 32 also includes aperture 34. An annular reinforcement sleeve 36 having an inner diameter larger than the diameter of aperture 34 (see FIG. 6) extends outwardly from reinforced portion 32, concentric with the aperture 34.

The second embodiment 40 of the pest control apparatus is depicted in FIGS. 7 and 8. Apparatus 40 comprises a single strip of essentially uniform cross-section having a first end portion 42 and a second end portion 44. The length, width, and depth parameters of the second embodiment 40 are similar to those described in conjunction with the first embodiment. A single aperture 46 is located within the upper, first portion 42 of the strip. An annular reinforcing eyelet or grommet 48 is affixed within and surrounds the aperture 46.

The device 40 may be conveniently extruded in an end-to-end interconnected fashion so that a plurality of the devices 40 can be kept and dispensed in roll form. To this end, it will be observed that the respective end edges 54, 56 of device 40 are of similar configuration. Moreover, a pair of interconnected, separable devices 40a, 40b are illustrated in FIG. 17 as they would appear prior to separation and use thereof.

The third embodiment 60 of the pest control apparatus is depicted in FIGS. 9 and 10. The device 60 is similar in most respects to the device 40 described immediately above, and like features are numbered with primed like numbers. The distinguishing feature between the device 40 and 60, however, is a pair of elongated wires 62 that run the length of the device 60 in generally parallel relationship. The wires 62 are received within integrally molded ribs 64 that extend outwardly from the body of the device 60. The wires may typically br employed to add strength to the overall strip device 60.

A fourth pest control device 70 in accordance with the present invention is depicted in FIGS. 11 and 12. The device 70 includes a central, generally rectangular, arcuate in cross-section mid-portion 72 that extends the length of device 70 between first and second end portions 74, 76. The mid-portion 72 is advantageously from about ¼ inch to 2 inches in width and may vary from 1/32 inch to ½ inch in thickness. The length of the device 70, which is determined by the length of the mid-portion 72, is for most applications preferably between about 6 and 12 inches. Three linearly aligned apertures 78, 80, 82 are located within mid-portion 72. The two apertures 78, 80 are positioned within the first necked-down end portion 74, and are interconnected by slit 84. Aperture 82 is located at the second end portion 76 of the device 70.

A pair of opposed, laterally extending, tapered fins 86 project outwardly from the mid-portion 72. Fins 86 each include a plurality of slits 88 which extend from the outer edge of the fins to the mid-portion 72. The fins 86 define an arcuate trailing edge at end portion 76 of the device 70, and also provide arcuate leading edges adjacent the first end portion 74.

Two embodiments of the pest control device in accordance with the present invention are depicted in FIGS. 14 and 15 in conjunction with a synthetic resin attachment stud 90. The stud 90 includes circular base plate 92 and piercing rod 94. A conical tip 96 is provided on the outermost end of piercing rod 94. It will be noted that the outer diameter of the base 98 of tip 96 is of greater diameter than the diameter of rod 94. In use, the rod 94 and tip 96 are used to pierce the ear of an animal, whereupon the device 40 (FIG. 14) or 20 (FIG. 15) is installed by pushing tip 96 through the mounting aperture 46 and grommet 48 (device 40) or the aperture 34 and sleeve 36 (device 20); in this fashion the devices are secured in a cantilever fashion to the animal's ear.

Pest control device 40 is depicted in FIG. 16 in conjunction with a plastic lock tie 100. The lock tie 100 includes an elongated portion having a serrated surface 102, and a locking end portion 104.

Figure 2:
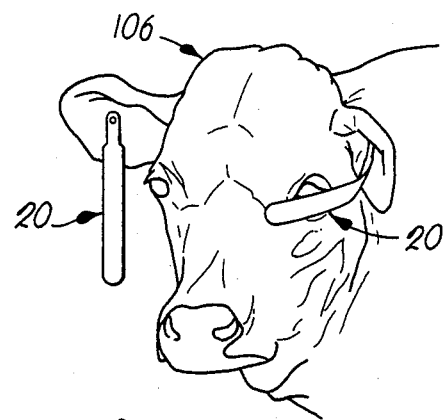
FIG. 2 is similar to FIG. 1 but depicting one of the pest conrol devices in contact with the facial area of the animal by virtue of the animal's natural movement.
Figure 3:
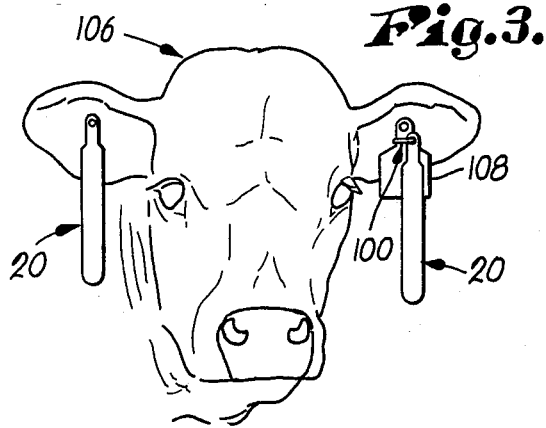
FIG. 3 is similar to FIG. 1, but depicts an alternative means of attaching the device.

Referring to FIG. 13, it will be seen that pest control device 70 can be affixed to a previously attached device 20 without the need for a separate direct attachment to the animal's ear, tail, leg, wing, or other frequency touched object(s). In this way, a replacement pest control device can be attached to a depleted device initially secured to the animal. Specifically, the second end portion 76 of the device 70 is bent back and inserted into and through the slit 84. This provides a circular configuration with an approximate two inch diameter opening for receiving the shank of device 20. The strip then can be pulled snugly around the shank of the ear tag 20 and twisted tightly into the ost appropriate of the several slits 88 cut along each of the fins 86. The self-attaching and locking mechanism of the device 70 permits attachment of the strip without the use of piercing studs while still allowing a flexible end portion to extend out from the self-attachment portion to provide the necessary direct contact of the device 70 with the preselected areas of the animal's exterior surface. Also it will be appreciated that the device 70 can also be attached in the same manner to an animal's tail, for example, the head of an animal 106 is depicted in FIGS. 1 through 3, the pest control device 20 may also be conveniently attached to a conventional rigid eartag 108 with a lock tie 100.

The second end portions of the pest control devices 20 are supported in cantilever fashion in spaced apart relationship with ears of animal 106. As the animal moves its head, the pest control devices 20 will come into contact with the facial area of the animal 106. Advantageously, each of the two devices 20 will at some point come into contact with at least about fifty percent of the facial area of the animal. In this manner, pesticide will be directly applied to the animal's facial area, thereby presenting a concentrated application of pesticide to one of the areas most often infested by parasites.

Figure 4:
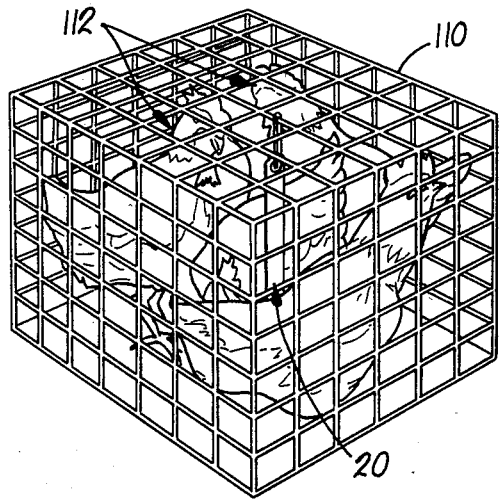
FIG. 4 is a perspective view of poultry within a confinement area, a pest control device in accordance with the present invention being located within the confinement area.

Referring to FIG. 4, it will be seen that the pest control device may be suspended from a cage 110 defining a confinement area for poultry 112. The poultry 112 will come into contact with the pest control device 20 as they move about the confinement area of the cage 110.

The products of this invention are generally useful in controlling ectoparasites which infest domestic animals and poultry. They are particularly useful against flies, lice, mites, and ticks. The following examples are provided to illustrate the present invention.

EXAMPLE 1

In this example a flexible pesticide control strip in accordance with the invention was compared with three commercially available pesticide-containing eartags, in order to determine long term efficacy. The flexible strip of the invention comprises the following ingredients: 10.5% permethrin, 56.4% polyvinyl chloride (B. F. Goodrich and Co., "Geon-30"), 27.6% dioctylphthalate (plasticizer), 0.5% epoxidized soybean oil, and 0.5% cadmium/zinc powder (Witco Chemical Co. "Argus Mark 152-S"), wherein all percentages are given on a weight basis. These ingredients were mixed in a steam-jacketed mixer at a temperature of about 185 degrees Fahrenheit, for approximately one-half hour, whereupon the mixture was fed into a conventional plastic extruder. The strips were extruded as flat, substantially clear, flexible strips of approximately 1 inch width, 8 inches in length and 1/32 inch in thickness. Subsequent to extrusion, attachment holes were punched in one end of the strips, and No. 0 brass grommets were installed in the apertures. The configuration of the completed strip is very similar to that depicted in FIGS. 7-8 of the drawings.

Eartag No. 1 used in the comparatives testing described below was a commercially available tag having an overall length of approximately $3\frac{1}{2}$ inches and an overall width of approximately $2\frac{1}{2}$ inches. The product was formed of synthetic resin material, and was stiff but bendable. Active ingredient in the tag is a known parasite control agent referred to in the art as "Fenvalerate"; this ingredient was present at a level of 8 percent by weight in the tag.

Eartag No. 2 was likewise a commercially available, synthetic resin tag having an overall length of approximately $2\frac{1}{2}$ inches, and a width of approximately 3 inches. The tag contained 10% permethrin, the same active ingredient used in the comparative strip of present invention.

Eartag No. 3 was another commercially available strip very similar to eartag No. 2, and likewise containing 10 percent permethrin.

In the test the comparative test control devices were attached to the ears of test cattle (one device per head). The strips of the invention were cantilever-mounted as depicted in FIGS. 1-2. The tagged animals belonged to cooperators and were pastured separate from other stock. Untreated animals in separate pastures near each treatment were used as control herds. All animals remained on pasture during the entire summer, the pastures being located in North Dakota. Fly counts were made by impartial observers, and such flies were counted on the treated and control animals on the same afternoon sometime between 1:00 and 5:00 p.m. Flies were counted on one side of five treated animals in each test herd, and the number reported is the average number of flies per side.

The results of this test are set forth in Table I. A review of the results of this Table will demonstrate that the strip of the present invention gave improved results, particularly toward the end of the test period. These improved results are believed to stem from the elongated, flexible nature of the strips, and the ability of such strips to move into direct contact with a large area of the animal's face and body, during natural movement of the animal.

EXAMPLE 2

Essentially flat, flexible medicated strips in accordance with the invention, and particularly the type illustrated in FIGS. 11-12 of the drawings, were produced for test purposes. The ingredient used in preparing these test strips were: 8.0% cypermethrin, 62.7% polyvinyl chloride, 25.0% dioctyl phthalate, 4.0% soybean oil, and 0.3% lubricants and stabilizers (calcium carbonate and the "Argus Mark 152-S" product), wherein all percentages are on a weight basis.

TABLE I

| Weeks Post Treatment | Ear Tag No. 1 | | Ear Tag No. 2 | | No. 2 (Dairy Cattle) Ear Tag | | Ear Tag No. 3 | | Strip of Invention | |
|---|---|---|---|---|---|---|---|---|---|---|
| | Treated | Control | Treated | Control | Treated | Control | Treated | Control | Treated | Control |
| 2 | — | — | — | — | — | — | 0 | 0 | 3 | 193 |
| 3 | — | 0 | — | — | — | — | 3 | 20 | 1 | 200 |
| 4 | — | — | 5 | 265 | 15 | 175 | 3 | 42 | 0 | 150 |
| 5 | 0 | 25 | — | — | — | — | — | — | 0 | 175 |
| 6 | — | — | 10 | 250 | 10 | 500 | 2 | 90 | 1 | 200 |
| 7 | 0 | 80 | — | — | — | — | — | — | 2 | 200 |
| 8 | — | — | 6 | 300 | 5 | 350 | 0 | 81 | 0 | 250 |
| 9 | 5 | 90 | — | — | — | — | 0 | 87 | 4 | 300 |
| 10 | — | — | 10 | 450 | 5 | 425 | 1 | 150 | 3 | 300 |
| 11 | 5 | 150 | — | — | — | — | 0 | 100 | 0 | 500 |
| 12 | — | — | 5 | 400 | 5 | 400 | — | — | 8 | 350 |
| 13 | — | — | — | — | — | — | — | — | 0 | 400 |
| 14 | 5 | 250 | — | — | — | — | 6 | 100 | 4 | 400 |
| 15 | — | — | — | — | — | — | 12 | 130 | 5 | 500 |
| 16 | 10 | 325 | — | — | — | — | — | — | 2 | 400 |
| 17 | — | — | | | | | | | | |
| 18 | 10 | 300 | | | | | | | | |
| 19 | 10 | 325 | | | | | | | | |

The materials were mixed as set forth in Example 1, and were extruded as essentially flat, flexible strips of approximately 1 inch in width and 8 inches in length. In addition, the strip as extruded included a ½ inch wide, raised, rounded rib-like portion along the length thereof. Subsequent to extrusion, a pair of apertures (referred to by the numeral 78, 80 in FIG. 11) were punched into the upper end of the strip, along with a slit (1.1 inch long) and the lateral slits 88. As noted, this configuration permits insertion of the remote end of the strip through the slit and aperture configuration, followed by locking of the strip in place through use of the lateral slits 88.

The strips as described above were tested for efficacy in control of face, horn, house and stable flies. Specifically, the strips were applied to both ears of test cattle, using attachment bands as illustrated in FIG. 16 of the drawing which were secured to previously implaced eartags. The overall configuration is illustrated in FIG. 3 of the drawings. The efficacy of the strips of the invention was measured as compared with untreated controls, over a 120 degree period, using the techniques described in Example 1. The results of this test are shown in Table II.

In Table II, the numbers in parentheses refer to percentage efficacy as compared with the controls, and it will be seen that the device of the invention gave excellent control, even at 120 days after treatment with the strips of the invention.

TABLE II

| Time Relative To Treatment | 2 Ears Stripped | | | Untreated Controls | | |
|---|---|---|---|---|---|---|
| | Face | Horn | House & Stable | Face | Horn | House & Stable |
| 7 days prior | 34.5 | 143 | 11.4 | 40.5 | 150 | 12.6 |
| 1 hour prior | 28.9 | 123 | 11.4 | 36.9 | 133 | 15.1 |
| Treatment Applied | | | | | | |
| 1 day post | 9.4 | 0 | 1.4 | — | — | — |
| | (74) | (100) | (90) | — | — | — |
| 7 days post | 4.5 | 4.1 | 1.5 | 29.8 | 204 | 7.4 |
| | (88) | (98) | (80) | (—) | (—) | (—) |
| 15 days post | 8.0 | 0 | 3.7 | 21.4 | 183 | 12.5 |
| | (63) | (100) | (70) | (—) | (—) | (—) |
| 21 days post | 4.1 | 0 | 1.8 | 39.7 | 200 | 23.0 |
| | (89) | (100) | (92) | (—) | (—) | (—) |
| 50 days post | 6.3 | 0 | 1.3 | 24.7 | 153 | 5.7 |
| | (74) | (100) | (77) | (—) | (—) | (—) |
| 80 days post | 5.0 | 0 | 2.4 | 25.8 | 185 | 5.5 |
| | (80) | (100) | (56) | (—) | (—) | (—) |
| 102 days post | 0.5 | 0 | 1.0 | 2.8 | 212 | 6.2 |
| | (82) | (100) | (84) | (—) | (—) | (—) |
| 120 days post | 0 | 0 | 3.5 | 0.6 | 108 | 3.6 |
| | (100) | (100) | (0) | (—) | (—) | (—) |

I claim:

1. An elongated, strip-type ectoparasite control device for animals, comprising:

an elongated, flexible, integral synthetic resin strip formed from a polyvinylic resin matrix and having opposed first and second end portions and an ectoparasite control composition uniformly dispersed throughout the entire length of said synthetic resin strip for continuous release of molecules of said composition from the surface of said strip and consequent continuous migration of replacement molecules of the composition from the matrix to the surface of the strip;

said strip having a durometer value of from about 50 to 90, a length of from about 5 to 12 inches, a width of from about ¼ to 2 inches, a thickness of from about 1/32 to ½ inches, and a length to width ratio of from about 2.5:1 to 48:1;

means for cantilever attachment of said first end portion at a desired attachment site on or adjacent an animal, with said second end portion hanging freely and swingably in spaced relationship to said attachment site, the length and flexibility of said strip being sufficient for said second end portion of said strip to swing into direct, at least partially conforming contact with adjacent surface areas of said animal during natural body movements of said animal or its appendages, for said release of molecules of said composition directly onto said surface area.

2. The device of claim 1, said attachment means including structure for attachment of said first end portion to the ear of said animal.

3. The device of claim 1, said strip being formed of polyvinyl chloride.

4. The device of claim 1, said composition comprising a pyrethroid.

5. The device of claim 1, said attachment means including structure for cantilever attachment of said first end portion to an object worn by said animal.

6. The device of claim 1, said composition being volatile in ambient air.

7. The device of claim 1, said strip including a plasticizer.

8. The device of claim 1, said composition comprising from about 2 to 25% by weight of said strip.

9. The device of claim 1, including at least one elongated reinforcing element extending along the length of said strip.

10. The device of claim 9, said element being in the form of wire.

11. The device of claim 1, including an elongated, integral reinforcing rib formed in said strip and extending along the length thereof.

* * * * *